Jan. 6, 1959      E. JACOBSEN      2,867,391
DUCTED WING FOR AIRCRAFT
Filed Dec. 7, 1953      2 Sheets-Sheet 1
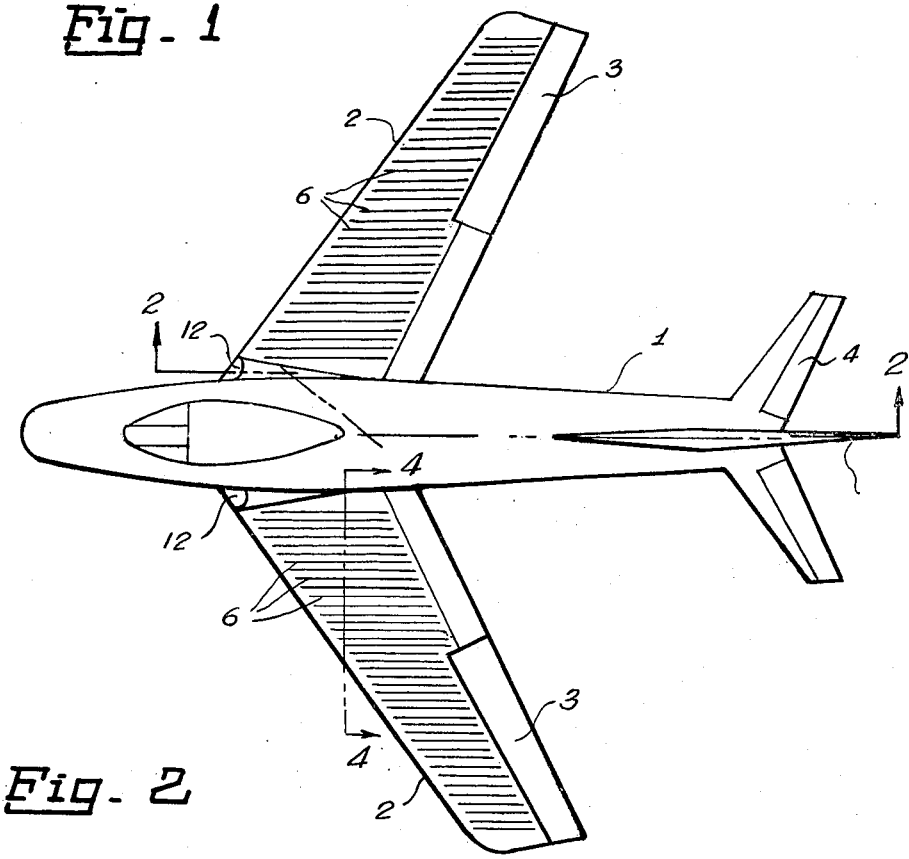
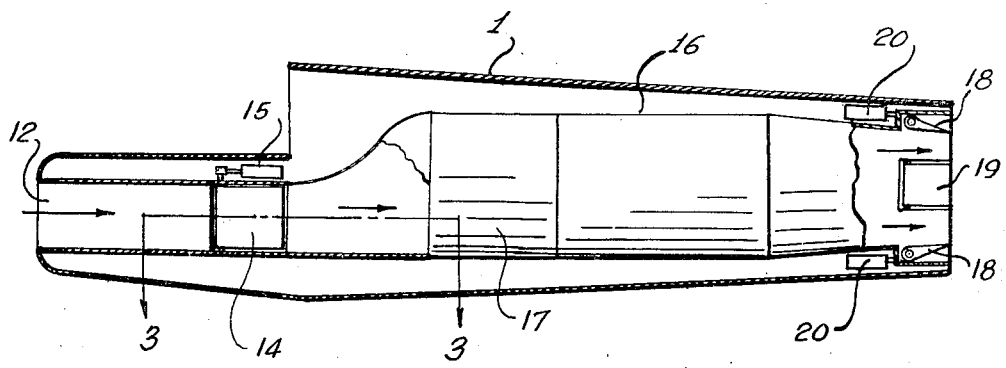
INVENTOR.
Edwin Jacobsen

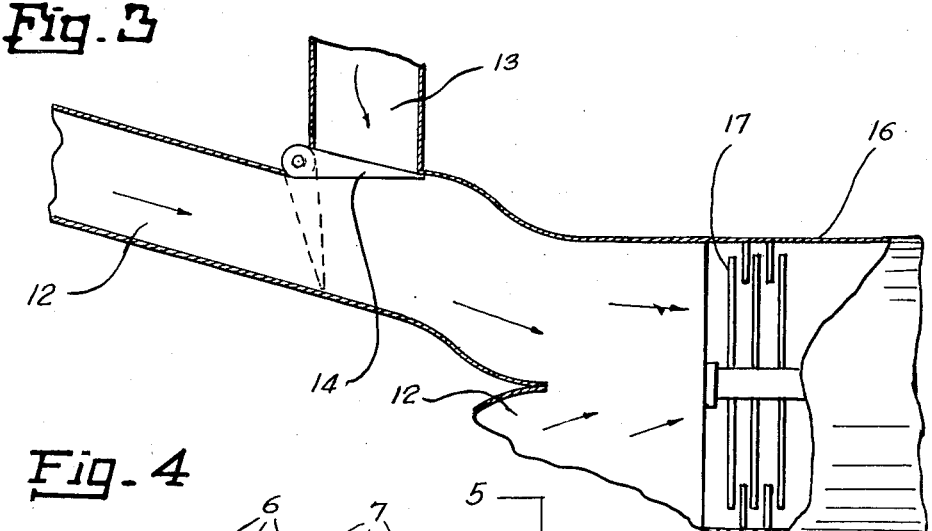
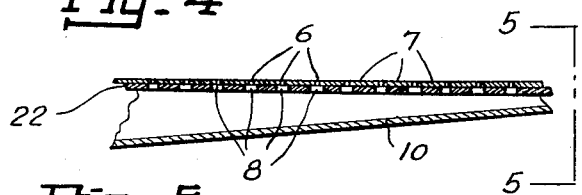
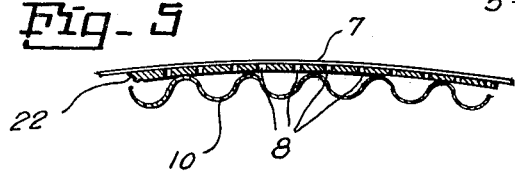
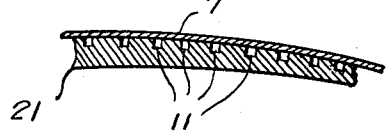
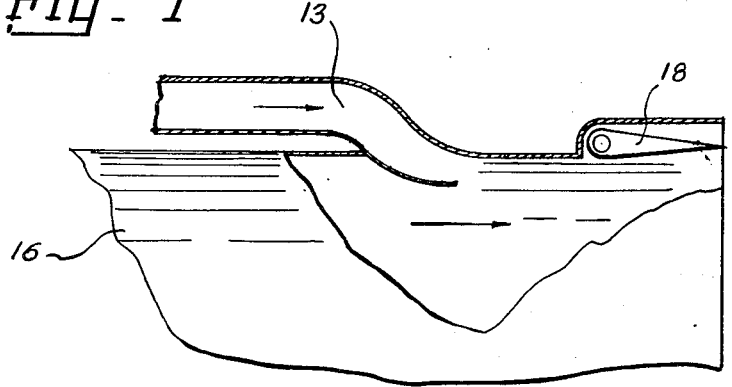

United States Patent Office 2,867,391
Patented Jan. 6, 1959

2,867,391

DUCTED WING FOR AIRCRAFT

Edwin Jacobsen, Altadena, Calif.

Application December 7, 1953, Serial No. 396,567

1 Claim. (Cl. 244—15)

This invention relates to airplanes and other airborne objects wherein a high degree of control and maneuverability is desired. This device is applicable to airplanes with various types of power plants but is particularly adaptable to jet power vehicles. It is well known that the jet power plant attains high efficiencies as the speed of the plane increases. For example, let us assume that a certain jet engine exerts a 6000 pound thrust at full throttle. For practical considerations this thrust remains nearly constant irrespective of the speed of the plane. Let us assume that this plane is traveling at 480 miles per hour or 8 miles per minute which is 42,240 feet per minute. The horsepower produced by the jet engine under these conditions is 7680. However, should the plane be traveling at 60 miles per hour or 5280 feet per minute, it will produce 960 horsepower. In each case the engine is putting forth just as much energy and consuming an equal amount of fuel. This is one of the disadvantages of the jet type craft, as compared to a propeller driven plane. In the case of the propeller craft, its maximum thrust is when the plane is standing still and as the plane begins to move and pick up speed the thrust gradually drops until at the speed of approximately 175 miles per hour the thrust has reached a value comparable to that of the jet unit. To overcome this initial thrust deficiency of the jet engine, afterburners have been added thereby obtaining some initial power for take off. This however does not entirely solve the problem as the thrust still does not equal that of the propeller driven plane and the fuel consumption is increased by the use of this device some 300 percent. Therefore, it is the purpose of this invention to utilize the present unavailable energy that exists between the slow moving or static plane and the velocity and thrust of the gas masses passing through the jet engine at throttle take off conditions.

This invention accomplishes this by constructing into the upper wing fuselage or other sections of the plane a multiplicity of slit or perforated orifices located substantially parallel to the line of flight. These orifices are connected in groups by a common manifold which leads to the main air inlet ducts of the jet engine. A power operated valve is so disposed in the air ducts so that a part or all the engine air may be drawn through the slit orifices. This action produces an air velocity on the upper surface of the plane thus reducing the pressure substantially below that of the atmosphere on the lower surface of the wing thereby producing lift. The slit form of orifice is used because when placed parallel to the line of flight, and but a few thousands of an inch wide it offers a minimum of air disturbance at subsonic or transonic speeds. Further these narrow slots will not choke inflow if the speeds through them are not supersonic. With sufficient slit area it is possible to lift the plane vertically should this be desirous. For this condition I provide control surfaces of carbon or ceramic coated material at the periphery of the jet exhaust. For normal flight these control surfaces may be nested into the outer walls of the jet exhaust thus providing an uninterrupted gas passage thrust area.

The primary object of this invention is to provide vertical lift to airplanes particularly jet powered planes, and thereby contribute maneuverability and safety to the art of heavier than air flight.

A further object of the invention is to provide a vertical lift means that will permit flat thin wings.

A still further object of the invention is to provide a method of lift for airplanes that will obviate the necessity for landing gears and consequently the need for long runways.

A still further object of the invention is to provide a lift method that may be distributed to several surfaces of the plane in such a manner that the resulting forces may be used as a stability control.

A still further object of the invention is to provide a method of applying lift to large and bulky bodies where crane or other facilities are not available or applicable.

A still further object of this invention is to provide a lift means that will reduce the wheel loads on vehicles such as automobiles, trucks and rail cars.

With these and incidental objects in view, the invention consists in certain novel features of construction and combination of parts, a preferred form of which is hereinafter shown with reference to the drawings which accompany and form a part of this specification.

In the drawings:

Fig. 1 is a plan view of a jet airplane with the vertical life device attached.

Fig. 2 is a fragmentary cross sectional view taken on line 2—2 of Fig. 1.

Fig. 3 is a fragmentary cross sectional view of one of the air control valves showing how all the air to the engine may be drawn through the orifices in the wings.

Fig. 4 is an enlarged fragmentary cross sectional view of the upper wing surface taken on line 4—4 of Fig. 1, looking in the direction indicated.

Fig. 5 is an enlarged cross sectional view taken on line 5—5 of Fig. 4, showing how the tapered hat section is used to form a manifold.

Fig. 6 shows an alternate construction of the view shown in Fig. 5 and is adaptable to extremely high speed planes having extremely thin solid wing sections.

Fig. 7 shows the manifold 13 leading to and entering the exhaust end of the engine and thus producing an injector type of air pump.

Referring more particularly to the drawings, the airplane shown is more or less conventional having the fuselage 1, the wings 2, the ailerons 3, the horizontal stabilizers 4 and the rudder 5. All these components are standard and are controlled and operated in the standard manner with conventional equipment for use when the plane is flown in a conventional manner. The air inlets 12, lead to the inlet side of the engine's air compressor 17. The manifolds 13 are joined to the air inlets 12 in such a manner that the butterfly valve 14 can close off entirely either of these passages or divide the flow in any given proportion. These manifolds take the shape of the corrugated section 10 which is fastened in an airtight manner to the wing's upper skin 22. On top of the skin 22, are the longitudinal strips 7, secured to the skin by adhesive or other means. These strips are placed in juxtaposition to each other so as to leave the small slots 6 between them. These slots may vary in width and in some cases may be but a few thousandths of an inch apart. Directly under these slots I provide the holes 8 in sufficient number and size to permit adequate air flow. At the down stream end of the engine 16, I provide the horizontal control surfaces 18, and the rudder surfaces 19, which react with the engine exhaust to permit control at low plane velocities. These control surfaces are actuated by the power cylinders 20. The valves 14 are actuated by the hydraulic cylinders 15. All these power controls are operated by the pilot in the conventional manner well known to the arts. From this description it may be seen that the engine's air may be taken through the regular ducts 12, or by moving the valve into the dotted position all the engine inlet air will be drawn through the slots 6 and the holes 8 by way of the manifolds 13.

Referring particularly to the alternate wing construction shown in Fig. 6, the basic wing is fabricated from a solid billet of metal 21. In this arrangement the manifolds 11, are milled into the solid metal billet 21, with the longitudinal strips 7 placed in the same manner as described for Fig. 6. This variation in design shows the adaptability of this device to the very high speed fighter type of aircraft.

Fig. 7 shows an alternate method of attaching the manifold 13 to the engine. In this case the manifold enters the engine in the exhaust stream in such a manner that it forms an injector type of air pump, this arrangement is essential when a monofuel type of engine is used.

The operation is as follows:

With the plane on the ground the engine is first run in the conventional manner drawing all its great quantities of inlet air through the ducts 12. The valves 14 are moved so that all the air is drawn through the slots 6. This induces a predetermined velocity on the plane's upper surface and as the velocity increases, the pressure falls below that of the surrounding atmosphere and this differential in pressure that now exists between the upper and lower surface of the wing produces lift. Further, the magnitude of the unit of lift may be modulated by the positioning of the valves 14.

Having thus described my invention, what I claim and desire to secure by Letters Patent is:

In a jet operated airplane having a jet engine, a compressor, and an exhaust tube, a foraminous wing surface consisting of an upper skin secured to a corrugated structural member which forms air manifolds with the underside of said upper skin, a multiplicity of narrow parallel strips placed in juxtaposition to each other on the upper side of said upper skin leaving narrow continuous slots between them, a multiplicity of holes disposed in the upper skin connecting said slots to said manifolds, said slots extending from a point near the leading edge to a point near the trailing edge of the wing substantially parallel to the longitudinal center line of the airplane, said air manifolds interconnecting the slots and the air compressor inlet of the jet engine, a valve for controlling the amount of air drawn through the slots and control surfaces disposed near the outlet end of the engine exhaust tube for use in vertical or low velocity flight.

References Cited in the file of this patent

UNITED STATES PATENTS

| | | |
|---|---|---|
| 2,514,513 | Price | July 11, 1950 |
| 2,517,524 | Beck | Aug. 1, 1950 |
| 2,568,813 | Lundberg | Sept. 25, 1951 |
| 2,745,611 | Sedille | May 15, 1956 |

FOREIGN PATENTS

| | | |
|---|---|---|
| 479,598 | Great Britain | Feb. 7, 1938 |
| 1,050,603 | France | Sept. 2, 1953 |